United States Patent
Jung et al.

(10) Patent No.: US 8,677,058 B2
(45) Date of Patent: Mar. 18, 2014

(54) MEMORY SYSTEM SELECTING WRITE MODE OF DATA BLOCK AND DATA WRITE METHOD THEREOF

(75) Inventors: Sung-Won Jung, Seoul (KR); Se-Jin Ahn, Seoul (KR); Tae-Min Lee, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 118 days.

(21) Appl. No.: 13/172,897

(22) Filed: Jun. 30, 2011

(65) Prior Publication Data
US 2012/0005415 A1 Jan. 5, 2012

(30) Foreign Application Priority Data

Jul. 2, 2010 (KR) ........................ 10-2010-0064048

(51) Int. Cl.
*G06F 12/00* (2006.01)

(52) U.S. Cl.
USPC ................... 711/103; 711/217; 711/E21.008

(58) Field of Classification Search
USPC ................................................ 711/103, 217
See application file for complete search history.

(56) References Cited

U.S. PATENT DOCUMENTS

| | | | |
|---|---|---|---|
| 7,366,013 B2 | 4/2008 | Roohparvar | |
| 7,529,129 B2 | 5/2009 | Roohparvar | |
| 7,545,673 B2 | 6/2009 | Lasser | |
| 2008/0104309 A1 | 5/2008 | Cheon et al. | |
| 2009/0013139 A1* | 1/2009 | Woo et al. | 711/162 |
| 2009/0310408 A1* | 12/2009 | Lee et al. | 365/185.03 |

FOREIGN PATENT DOCUMENTS

| | | |
|---|---|---|
| KR | 100771521 B2 | 10/2007 |
| KR | 1020080085158 A | 9/2008 |
| WO | 2007/067768 A1 | 6/2007 |
| WO | 2009/040785 A1 | 4/2009 |

* cited by examiner

*Primary Examiner* — Reginald Bragdon
*Assistant Examiner* — Aracelis Ruiz
(74) *Attorney, Agent, or Firm* — Volentine & Whitt, PLLC

(57) ABSTRACT

A method of performing a write operation in a nonvolatile memory device comprises storing write data in a log block used to update a data block, determining whether a write pattern stored in the log block is a sequential write pattern or a random write pattern, and selecting a new data block for storing merged data in the data block and the log block. The new data block is determined to be a single-level cell block or a multi-level cell block according to the determined write pattern.

20 Claims, 15 Drawing Sheets

MEMORY SYSTEM SELECTING WRITE MODE OF DATA BLOCK AND DATA WRITE METHOD THEREOF

CROSS-REFERENCE TO RELATED APPLICATIONS

This application claims priority under 35 U.S.C. §119 to Korean Patent Application No. 10-2010-0064048 filed on Jul. 2, 2010, the disclosure of which is hereby incorporated by reference in its entirety.

BACKGROUND OF THE INVENTION

Embodiments of the inventive concept relate generally to semiconductor memory technologies, and more particularly, to memory systems and methods that select a write mode of a data block according to a write pattern of a log block.

Semiconductor memory devices can be roughly divided into two categories according to whether they retain stored data when disconnected from power. These categories include volatile memory devices, which lose stored data when disconnected from power, and nonvolatile memory devices, which retain stored data when disconnected from power.

Volatile memory devices tend to have higher read and write speeds compared with nonvolatile memory devices. However, because they lose stored data when disconnected from power, they are not generally used to provide long-term data storage.

Flash memory is an increasingly popular form of nonvolatile memory due to various attractive features such as relatively high integration density, low power consumption, and the ability to withstand physical shock. However, the continuing demand for flash memory puts pressure on researchers to improve its performance and storage capacity. One technique that has been adopted for increasing the storage capacity of flash memory is increasing the number of bits stored in each memory cell. A memory cell that stores multiple bits of data is called a multi-level cell (MLC) and a memory cell that stores only one bit of data is called a single-level cell (SLC).

Flash memories are generally programmed in units of pages or words, and erased in units of blocks. Because the units of program and erase operations differ, a page of data may be moved to a new physical location to allow an entire block to be erased. Accordingly, to preserve the logical addressing of the moved page, a flash memory can incorporate a flash translation layer (FTL) that maps between a logical address (LA) used by a host system to address data, and a physical address (PA) where the data is actually stored.

Some flash memories use a hybrid mapping (or log mapping) method in which page data to be stored in a data block is first updated to a log block during a write operation. Once all pages of a log block are used or there is no usable log block, data stored in a log block and additional data stored in a data block are copied to a new data block through a merge operation. In general, the write performance of a memory system is limited by the speed at which data can be buffered into a log block, and the speed at which the buffered data can be merged into a new data block. Consequently, efficient merge operations can significantly improve the performance of a memory system.

SUMMARY

In accordance with one embodiment of the inventive concept, a method of performing a write operation in a nonvolatile memory device comprises storing write data in a log block for updating a data block, determining whether a write pattern of data in the log block is a sequential write pattern or a random write pattern, and selecting a new data block for storing merged data from the data block and the log block, the new data block being an SLC block or an MLC block depending on the determined write pattern.

In accordance with another embodiment of the inventive concept, a memory system comprises a nonvolatile memory device configured to program data in a memory block according to a write mode that is an SLC mode or an MLC mode, and a memory controller configured to control the nonvolatile memory device according to an address mapping method that uses a log block to update a selected data block, the memory controller determining the write mode for merging data from the log block and the data block into a new memory block according to a write pattern of data in the log block.

In accordance with another embodiment of the inventive concept, a method of operating a nonvolatile memory device comprises designating an MLC memory block as a log block for buffering data to be stored in a data block, determining a write pattern of data stored in the log block, and merging data from the log block and the data block into a new data block in an SLC mode or an MLC mode according to whether the write pattern is a sequential write pattern or a random write pattern.

These and other embodiments of the inventive concept can be used to improve the performance of write operations performed by various systems.

BRIEF DESCRIPTION OF THE DRAWINGS

The drawings illustrate non-exhaustive and non-limiting embodiments of the inventive concept. In the drawings, like reference numbers indicate like features where practical. The drawings are not necessarily to scale, emphasis instead being placed upon illustrating aspects of the inventive concept.

DETAILED DESCRIPTION

Embodiments of the inventive concept are described below with reference to the accompanying drawings. These embodiments are presented as teaching examples and should not be construed to limit the scope of the inventive concept.

In the description that follows, a NAND flash memory device is presented as one example of a nonvolatile memory device in which the inventive concept can be embodied. However, the inventive concept can be embodied in other types of nonvolatile memory, such as phase-change random access memory (PRAM), magnetic random access memory (MRAM), resistive random access memory (ReRAM), ferroelectric random access memory (FRAM), and NOR flash memory.

Figure 1:
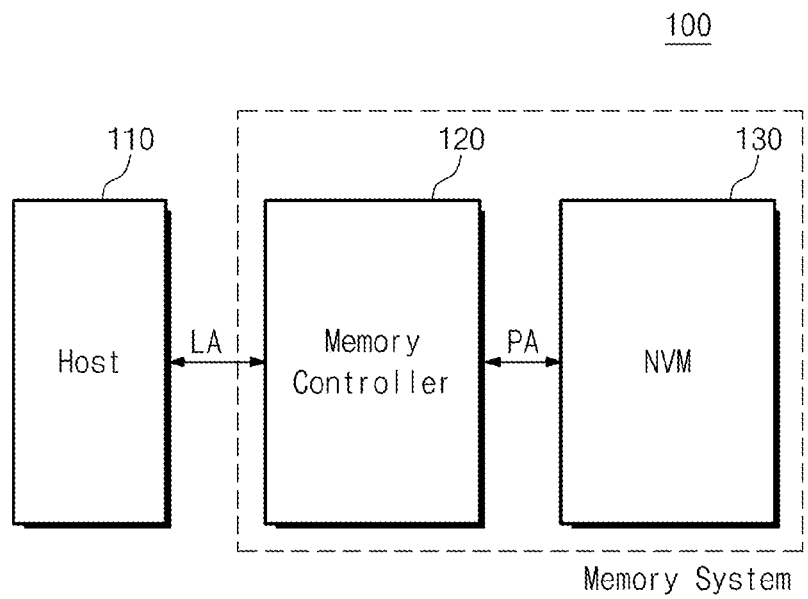
FIG. 1 is a block diagram of a computing system comprising a memory system according to an embodiment of the inventive concept.

FIG. 1 is a block diagram of a computing system 100 comprising a memory system according to an embodiment of the inventive concept. Referring to FIG. 1, computing system 100 comprises the memory system in combination with a host 110. The memory system comprises a memory controller 120 and a nonvolatile memory device 130.

Host 110 transfers write data and a logical address LA to the memory system in response to a write request.

Memory controller 120 provides an interface between host 110 and nonvolatile memory device 130. Memory controller 120 controls nonvolatile memory device 130 to write data provided from host 110 into nonvolatile memory device 130 in response to a write command from host 110. In addition, memory controller 120 controls a read operation of nonvolatile memory device 130 in response to a read command from host 110.

Memory controller 120 stores write data provided from host 110 in a log block, and the data stored in the log block is subsequently written into a new data block through a merge operation. Memory controller 120 allocates an MLC block as the log block, and selectively allocates an SLC block or an MLC block as a new data block to receive data from the log block in a merge operation. Memory controller 120 selects the new data block according to a pattern of data stored in the log block.

Memory controller 120 comprises an FTL implemented, which provides a mechanism for hiding erase operations of nonvolatile memory device 130 between a file system of host 110 and nonvolatile memory device 130. The FTL is designed to mitigate limitations of nonvolatile memory device 130 due to the different sized units used to perform erase and write operations. It does so by mapping a logical address LA maintained by the file system of host 110 to a physical address PA of nonvolatile memory device 130.

Nonvolatile memory device 130 comprises nonvolatile memory cells that retain stored data even when disconnected from power. Nonvolatile memory device 130 can write data in an SLC mode or an MLC mode under the control of memory controller 120.

In computing system 100, an SLC block or an MLC block is allocated as a new data block according to a write pattern of data store in a log block. This can allow high-speed data writing to be performed even in the presence of merge operations. In certain embodiments, computing system 100 can incorporate an SSD as the memory system. In such embodiments, memory controller 120 can be configured to communicate with an external entity, such as a host, through one of various interface protocols such as USB, MMC, PCI-E, SATA, PATA, SCSI, ESDI, and IDE.

Figure 2:
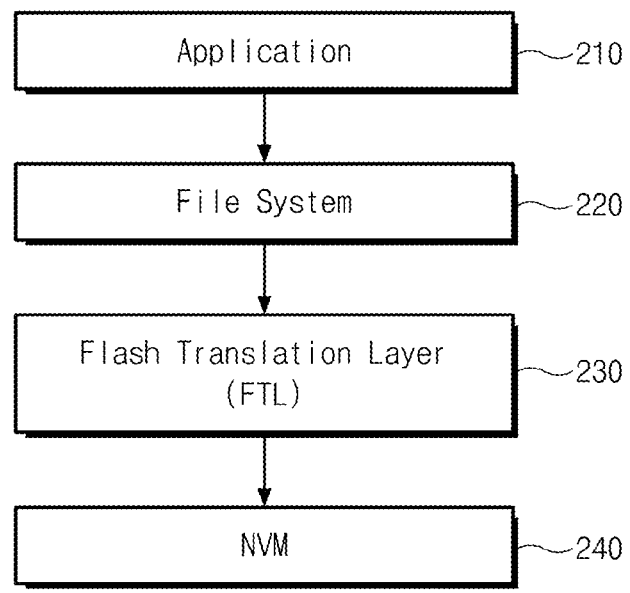
FIG. 2 is a diagram of a hierarchical architecture of software for driving the memory system of FIG. 1 according to an embodiment of the inventive concept.

FIG. 2 is a diagram illustrating a hierarchical architecture of software for driving the memory system of FIG. 1. Referring to FIG. 2, an FTL 230 performs address translation for write and read operations with respect to nonvolatile memory device 240 by using a logical address (e.g., a sector address and a number of sectors) transmitted from software 210 and a file system 220 as parameters.

FTL 230 comprises an address mapping table that maps a physical address PA of flash memory 130 to a logical address LA. FTL 230 is typically stored in memory controller 120. Alternatively, FTL 230 can be partitioned and stored in multiple devices so that its functions are performed in different locations.

Figure 3:
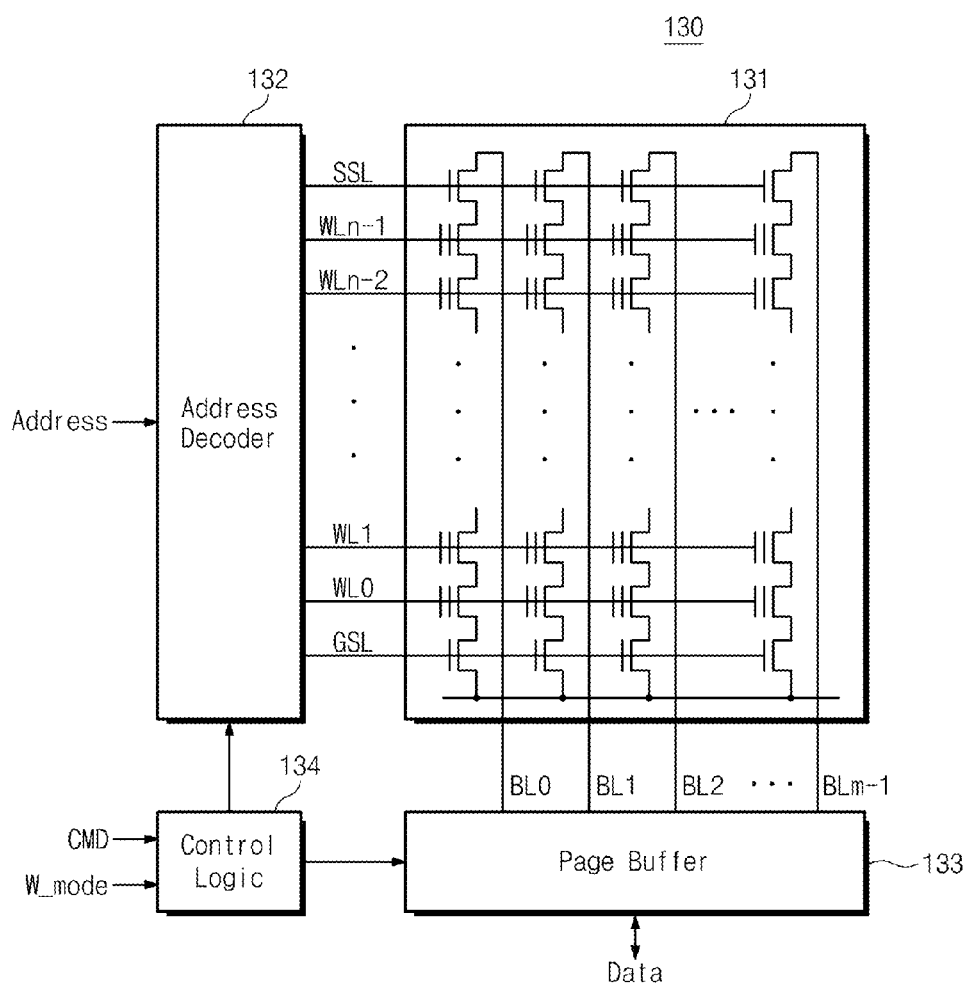
FIG. 3 is a block diagram of a nonvolatile memory device in FIG. 1 according to an embodiment of the inventive concept.

FIG. 3 is a block diagram of nonvolatile memory device 130 shown in FIG. 1. In the embodiment of FIG. 3, nonvolatile memory device 130 comprises a cell array 131, an address decoder 132, a page buffer 133, and control logic 134.

Cell array 131 comprises a plurality of memory blocks. For brevity of description, only one memory block of cell array 131 is shown in FIG. 3. Each of the memory blocks comprises a plurality of pages, and each of the pages comprises a plurality of memory cells. In nonvolatile memory device 130, erase operations are performed in memory block units, and write and read operations are performed in page units.

Cell array 131 comprises a plurality of memory cells each having a cell string structure. Each cell string comprises a string selection transistor SST connected to a string selection line SSL, a plurality of memory cells connected to a plurality of wordlines WL0~WLn−1, and a ground selection transistor GST connected to a ground selection line GSL. String selection transistor SST is connected to a bitline BL, and ground selection transistor GST is connected to a common source line CSL.

Address decoder 132 is connected to cell array 131 through string selection line SSL and ground selection line GSL or wordlines WL0~WLn−1. During a program or read operation, address decoder 132 receives an address and selects a wordline (e.g., WL1). Address decoder 132 transfers a voltage required for a program or read operation to a selected wordline or an unselected wordline.

Page buffer 133 operates as a write driver or a sense amplifier according to an operating mode of nonvolatile memory device 130. Page buffer 133 temporarily stores data to be programmed to selected memory cells or data read from selected memory cells. Page buffer 133 is connected to cell array 131 through bitlines BL0~BLm−1. Page buffer 133 receives data and transfers the received data to memory cells of a selected page during a program operation. Page buffer 133 reads data from the memory cells of a selected page and outputs read data to an external destination during a read operation.

Control logic 134 controls program operations, read operations, and erase operations of nonvolatile memory device 130. During a program operation, control logic 134 controls decoder 132 to provide a program voltage to a selected wordline. Control logic 134 controls page buffer 133 to provide programmed data to a selected page. Control logic 134 writes written data in an SLC mode or an MLC mode in response to an external write mode signal W_mode.

Figure 4:
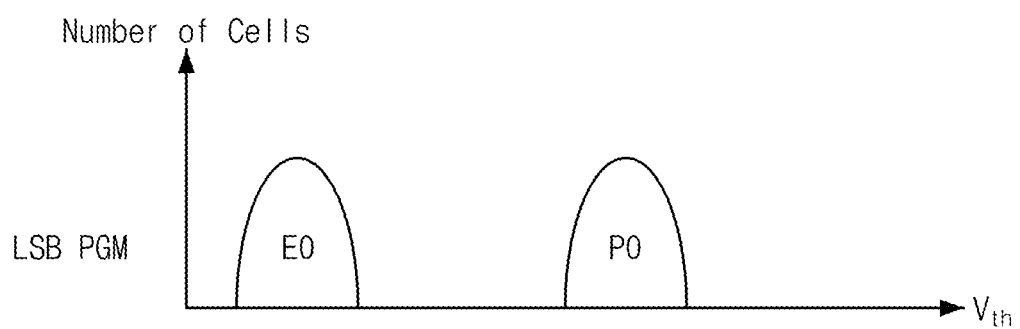
FIG. 4 is a graph illustrating threshold voltage states of a nonvolatile memory cell according to an embodiment of the inventive concept.
Figure 4:
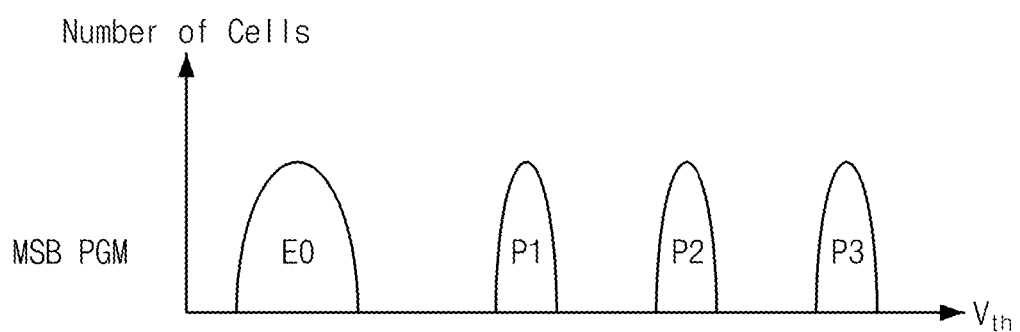

FIG. 4 illustrates threshold voltage states of a nonvolatile memory cell. Referring to FIG. 4, a 2-bit MLC is configured to store 2 bits of data using threshold voltage states E0, P1, P2, and P3. A least significant bit (LSB) is written in the memory cell by placing it in an erased state E0 or a programmed state P0. A most significant bit (MSB) is programmed into the memory cell by placing it in erased state E0, or one of three programmed states P1, P2, and P3. An LSB page is programmed into selected memory cells connected to the same wordline by programming an LSB in each of the memory cells. Similarly, an MSB page is programmed into selected memory cells connected to the same wordline by programming an MSB in each of the memory cells.

The time required to program an MSB page into selected memory cells is generally longer than the time required to program an LSB page. Accordingly, a memory block can be configured so that it is accessible in an SLC mode in which only LSB data is programmed, or an MLC mode in which LSB data and MSB data are both programmed. Where a selected memory block is accessed in the MLC mode, a write operation and a read operation of an MSB page are performed. A write or a read operation of the MSB page requires a procedure for distinguishing between erase state E0 and programmed states P1, P2, and P3.

Although a threshold voltage distribution of a 2-bit multi-level cell is shown in FIG. 4, the inventive concept can also be applied to nonvolatile memory devices having 3-bit or more-bit multi-level cells.

Figure 5:
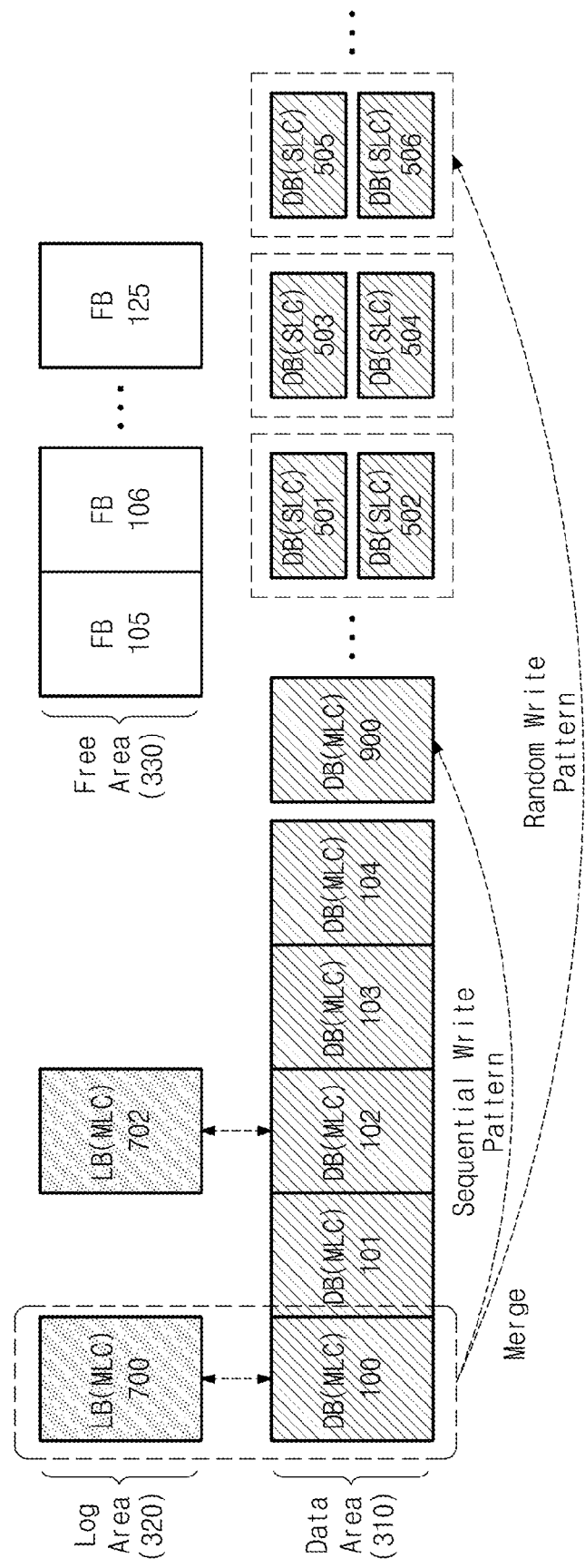
FIG. 5 is a diagram illustrating a method of performing a merge operation according to an embodiment of the inventive concept.

FIG. 5 is a diagram illustrating a method of performing a merge operation according to an embodiment of the inventive concept. The method of FIG. 5 will be explained with reference to the memory system illustrated in FIG. 1.

Referring to FIG. 5, memory controller 120 manages memory blocks of nonvolatile memory device 130 after dividing the memory blocks into a data area 310, a log area 320, and a free area 330.

Data area 310 comprises data blocks for storing write data. MLC blocks having physical block numbers (PBNs) 100, 101, 103, 104, and 900 are included in data area 310. In addition, SLC blocks (SLC DBs) having PBNs 501, 502, 503, 504, 505, and 506 are included in data area 310. SLC blocks 501, 502, 503, 504, 505, and 506 receive write data in an SLC mode of a write operation. MLC blocks 100, 101, 103, 104, and 900 receive write data in an MLC mode of the write operation.

Log area 320 includes log blocks for updating an externally selected data block. For example, log area 320 includes log blocks having PBNs 700 and 702. Log block 700 is allocated to update data block 100, and log block 702 is allocated to update data block 102.

A memory block erased by a merge operation or a garbage collection or memory blocks (free blocks) having invalid data are allocated to free area 330. Free area 330 comprises free blocks having physical block numbers (PBNs) 105, 106, . . . , and 125. Where a new log block is required during a write operation of data, one of the free blocks in free area 330 is selected and designated as a log block.

One or more log blocks can be allocated to each data block. Accordingly, two physical blocks can be allocated to each logical block address of host 110. As an example, memory controller 120 can allocate data block 100 and log block 700 to a logical block designated by a logical address LA. In this regard, the mapping illustrated in FIG. 5 may be referred to as a "one-to-two (1:2) mapping". In the one-to-two mapping, log block 700 comprises page data corresponding to data block 100.

Where a write request is transferred from host 110, memory controller 120 determines whether there is a log block allocated to a designated corresponding data block from host 110. Where there is a log block allocated to a corresponding data block, the allocated log block is used. However, where there is no log block allocated to a corresponding data block, memory controller 120 allocates one of the free blocks in free area 330 as a new log block.

Where the data stored in log block 700 and valid data of data block 100 has the same size as one data block, log block 700 and data block 100 are merged together. Valid page data in log block 700 and data block 100 are copied to a block in free area 330 in an in-place order. The free block to which the merged data is copied is designated as a new data block corresponding to a logical address LA provided from host 110. Log block 700 and data block 100 are erased and allocated to free area 330.

Memory blocks in data area 310 can be designated as SLC blocks or MLC blocks. Meanwhile, log blocks (e.g., 700 or 702) are all MLC blocks. Accordingly, where data is stored in a log block according to a sequential write pattern, the merged data is written into an MLC block. On the other hand, when data is stored in a log block according to a random write pattern, the merged data is written into an SLC block.

For example, when data is stored in log block 700 according to a sequential write pattern, valid data existing in log block 700 and data block 100 are merged together. The merged data is written into a free block among free blocks disposed in free area 330 in an MLC mode. The free block receiving the merged data is designated as a new data block 900.

Where data is stored in log block 700 according to a random write pattern, the merged data is written into at least two free blocks of free area 330 in an SLC mode. The free blocks receiving the merged data are designated as data blocks 501 and 502. Where one memory block is written in the SLC mode, its capacity is reduced by half as compared with a 2-bit MLC mode. Accordingly, where the merged data is written in the SLC mode, the number of free blocks needed in the SLC mode is at least two times larger than in the MLC mode.

In the foregoing embodiment, a block receiving merged data is selected as an SLC block or an MLC block depending on a write pattern of data updated to a log block. As a result, efficiency of a merge operation of a nonvolatile memory device is enhanced. In particular, there can be a decrease in the number of page copies conducted during a merge operation, or an improvement in the speed of a program operation performed during the merge operation.

Figure 6:
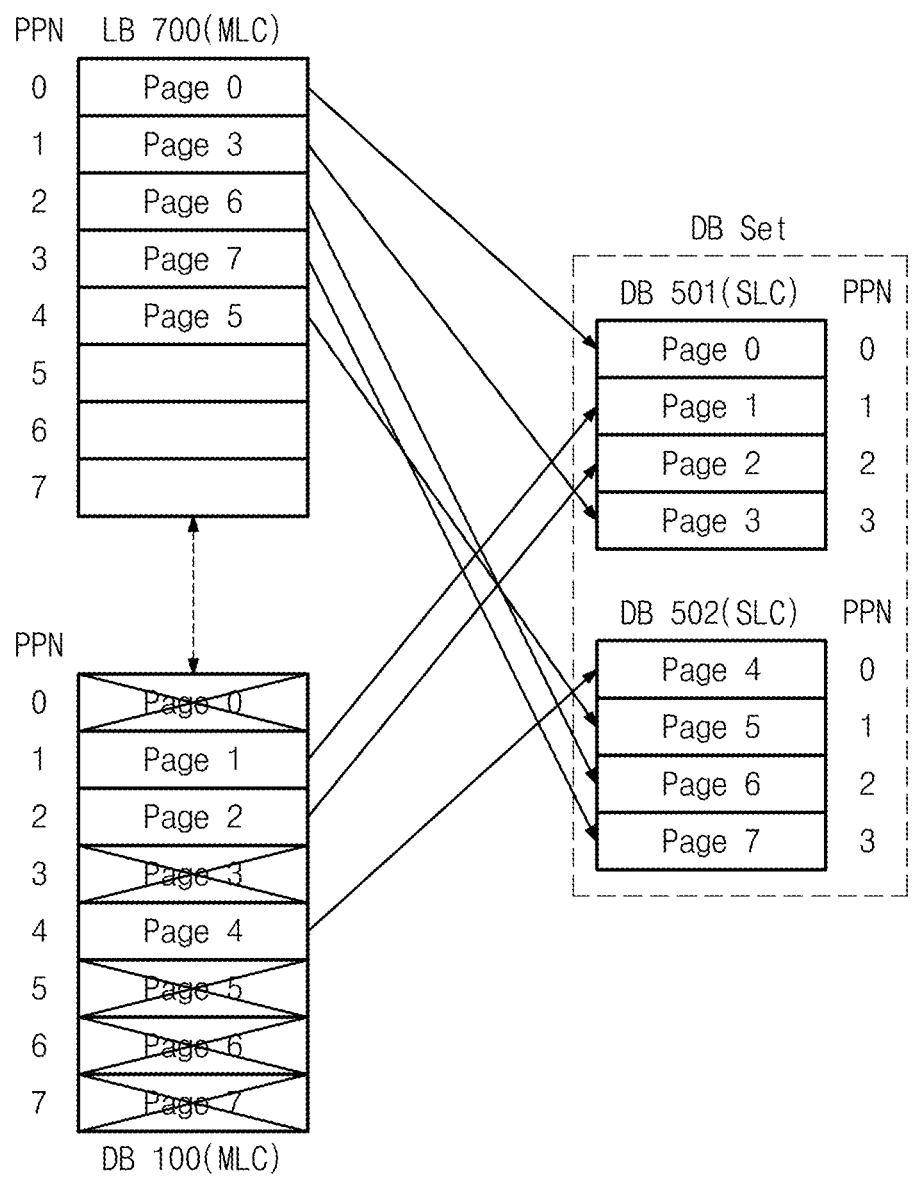
FIG. 6 is a diagram illustrating a method of performing a merge operation according to an embodiment of the inventive concept.

FIG. 6 is a diagram illustrating a method of performing a merge operation according to an embodiment of the inventive concept. The method of FIG. 6 is described with respect to computing system 100 of FIG. 1.

Referring to FIG. 6, data is stored in a log block 700 assigned to a data block 100 according to a random write pattern. Data stored in log block 700 and data block 100 are merged together. The merged data is sequentially written into a data block set (DB set) comprising SLC blocks DB 501 and DB 502, as described below.

Where a write request is received from host 110, a log block 700 is allocated to data block 100 corresponding to the write request. In addition, page data 0, 3, 6, 7, and 5 corresponding to the write request is stored in log block 700 to update data block 100. That is, page data 0, 3, 6, 7, and 5 of data block 100 is invalidated.

Valid pages remaining in log block 700 and data block 100 are copied to a new data block set comprising data blocks 501 and 502 by a merge operation. Because data is written into log block 700 according to the random write pattern, an SLC block is selected as a new data block to receive merged data. A data block having the same or higher capacity than an MLC block is allocated such that updated data of log block 700, which is an MLC block, is stored after being merged. For example, if the storage capacity of one MLC block is eight pages, a full capacity may amount to eight pages when updated data is merged into a log block. Accordingly, a new data block to store the merged data therein should have capacity of at least eight pages. However, because only four pages can be stored in an SLC block, the now data block should include a data block set comprising at least two SLC blocks DB 501 and DB 502.

Because data stored in log block 700 is written in a random pattern, the number of page copy operations required for a merge operation may be increased. Accordingly, an SLC block of relatively high programming speed is allocated as a new data block for storing merged data to improve the speed of the merge operation. For instance, pages 0 through 3 are sequentially programmed to data block 501 and pages 4 through 7 are sequentially programmed to data block 502.

Sequential writing of pages from page 0 into one memory block is called "in-place order". On the other hand, random writing of pages into one memory block is called "out-of-place order" or "random-place order". Where page data stored in log block 700 is randomly stored in data block 100 (i.e., out-of-place order), the time required for a merge operation becomes relatively longer. Where a log block is written according a random write pattern, an SLB block of relatively higher programming speed is allocated as a new data block to store merged data. As a result, merging speed may be prevented from decreasing where the log block is written according to the random write pattern.

Figure 7:
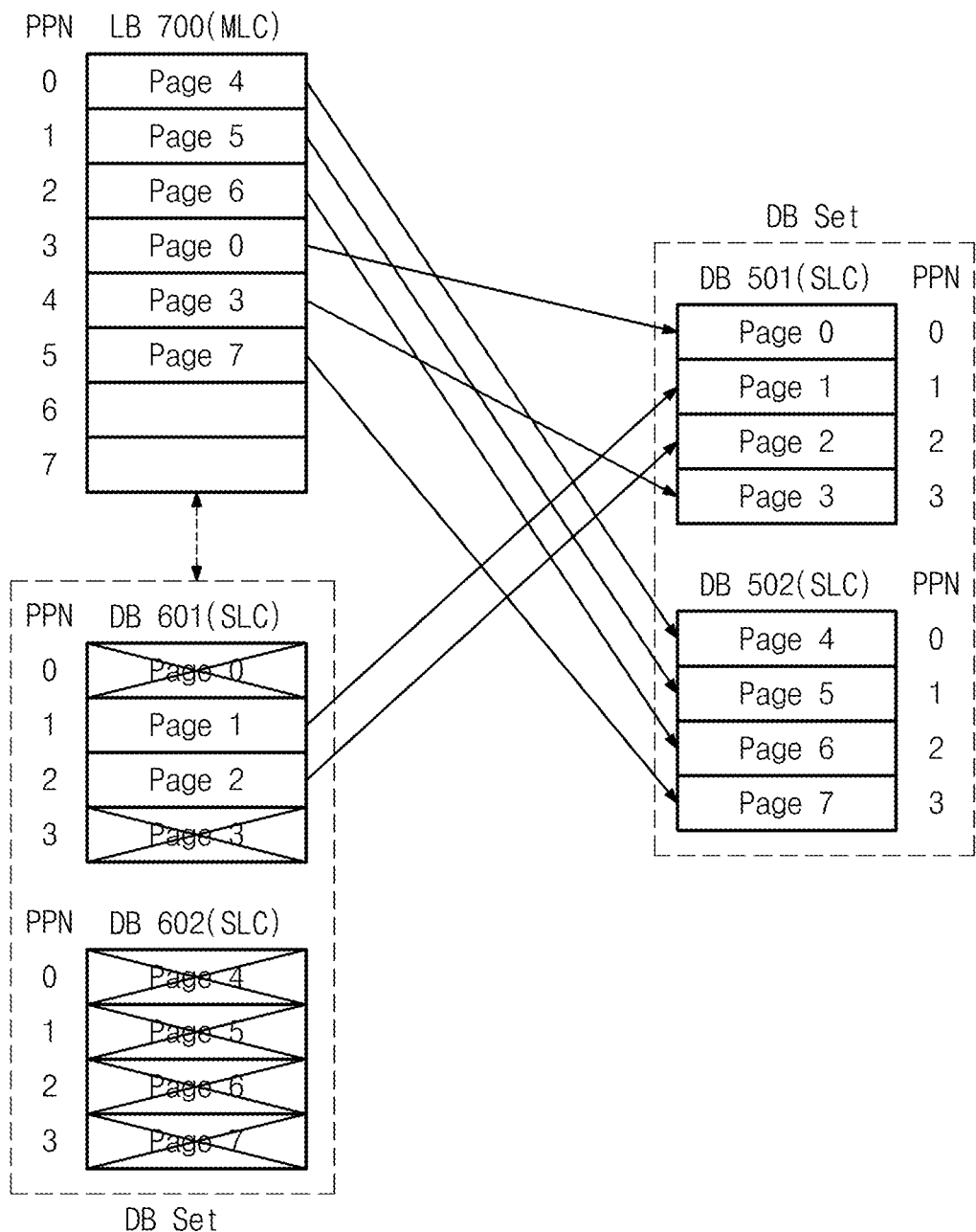
FIG. 7 is a diagram illustrating a method of performing a merge operation according to another embodiment of the inventive concept.

FIG. 7 illustrates a method of performing a merge operation according to another embodiment of the inventive concept.

Referring to FIG. 7, data is written into log block 700 assigned to a data block set comprising data blocks 601 and 602. The data is written in log block 700 in a random write pattern. At this point, the data in log block 700 and in data blocks 601 and 602 is merged together. The merged data is sequentially written into a new data block set comprising data blocks 501 and 502, which are SLC blocks, as described below.

In response to a write request received from host 100, log block 700 is assigned to data blocks 601 and 602 corresponding to a write address. During a previous merge operation, data blocks 601 and 602 are data block used to store data buffered according to a random write pattern after merging the data.

Page data 4, 5, 6, 0, 3, Page 7 are stored in log block 700. A write order of page data updated to log block 700 is irrelevant to an order of data stored in the data block set comprising data blocks 601 and 602. Data is written into log block 700 according to a random write pattern, and page data 4, 5, 6, 0, 3, and 7 in data blocks 601 and 602 are invalidated.

Valid pages remaining in log block 700 and data blocks 601 and 602 are copied to data blocks 501 and 502 by a merge operation. Because data is written into log block 700 according to the random write pattern, an SLC block is selected as a new data block for receiving the merged data. A data block having the same capacity as an MLC block must be allocated to store the merged data. Accordingly, a data block set must comprise at least two SLC blocks 501 and 502.

Data stored in log block 700 is randomly stored data irrespective of arrangement of data blocks 601 and 602. Consequently, the number of page copy operations is necessarily increased to align pages of random order. For this reason, an SLC block of relatively higher programming speed is allocated as a new data block to improve merging speed. Pages 0 through 3 are sequentially programmed to data block 501, and pages 4 through 7 are sequentially programmed to data block 502. When data is stored in log block 111 according to a random write pattern (or out-of-position order), the time required for a merge operation must be compensated. Merged data is sequentially written into data blocks 501 and 502 comprising SLC blocks of relatively high programming speed to reduce the time required for a merge operation.

Various merge methods have been described in FIGS. 6 and 7. In a data write method, a log block is an MLC block, and a random write pattern from the log block is sequentially written into a data block set comprising SLC blocks. The merged data is programmed to the SLC block to compensate write performance degradation of a memory system resulting from the random write pattern.

Figure 8:
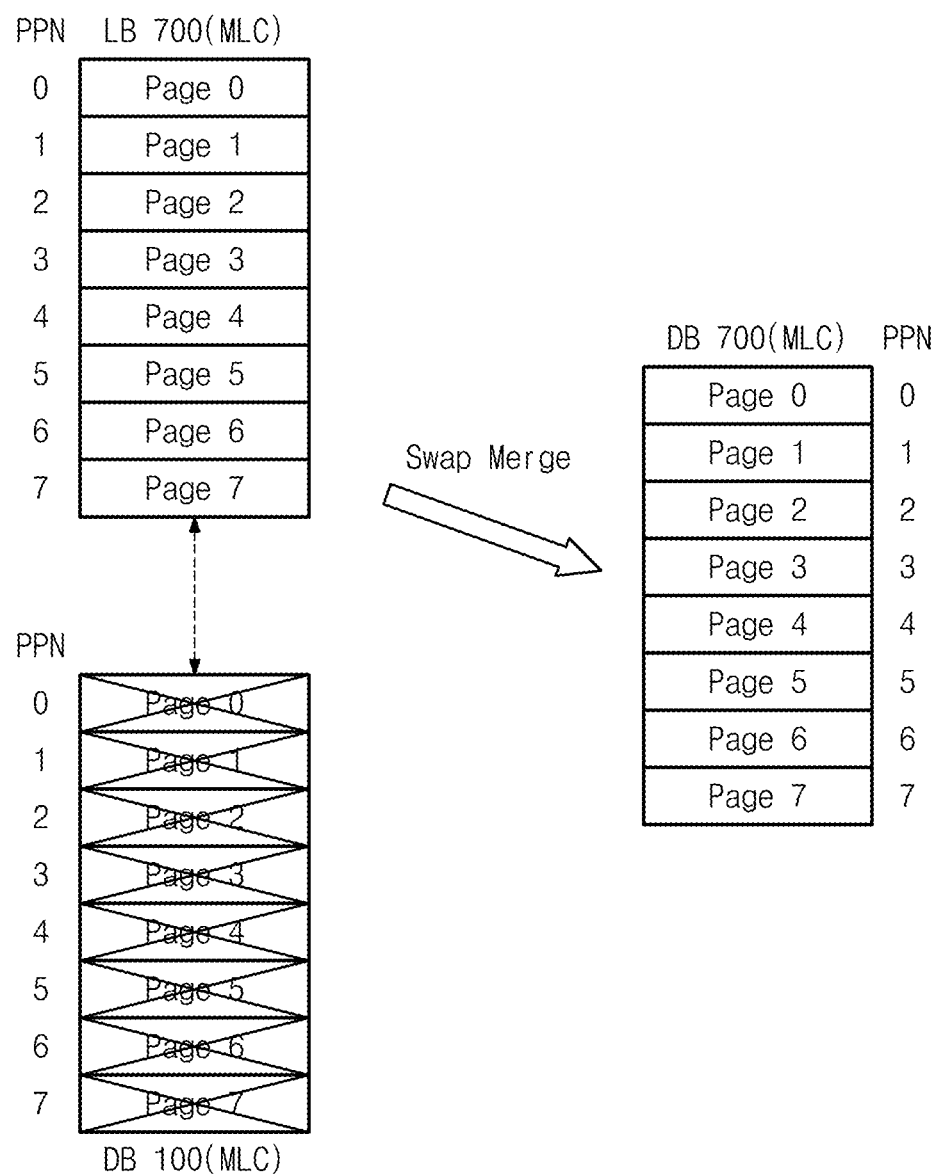
FIG. 8 is a diagram illustrating a method of performing a merge operation for data buffered according to a sequential write pattern according to an embodiment of the inventive concept.

FIG. 8 is a diagram illustrating a method of performing a merge operation on data buffered according to a sequential write pattern in accordance with an embodiment of the inventive concept.

Referring to FIG. 8, data is stored in log block 700 allocated to data block 100 comprising an MLC block according to a sequential write pattern. A swap merge operation is performed to designate log block 700 as a new data block 700, as will be described below.

In response to a write request, log block 700 is allocated to data block 100 corresponding to a write-requested logical address LA. Write-requested page data 0, 1, 2, 3, 4, 5, 6, and 7 is sequentially stored in log block 700 according to a sequential write pattern. Page data 0, 1, 2, 3, 4, 5, 6, and 7 in data block 100 is invalidated.

In this case, the data stored in log block 700 according to the sequential writing pattern is merged without additional page copy operations. This is because data buffered in log block 700 previously has a page arrangement corresponding to an in-space order. Accordingly, log block 700 is registered as a new data block corresponding to an externally designated logical address LA. Such a merge operation is called a swap merge operation.

In the swap merge operation, a merge operation is performed by manipulating only address mapping information of a log block to sequentially write data therein. Thus, the number of page copy operations can be reduced by applying a swap merge operation to a log block 700 buffering data therein according to a sequential write pattern.

Figure 9:
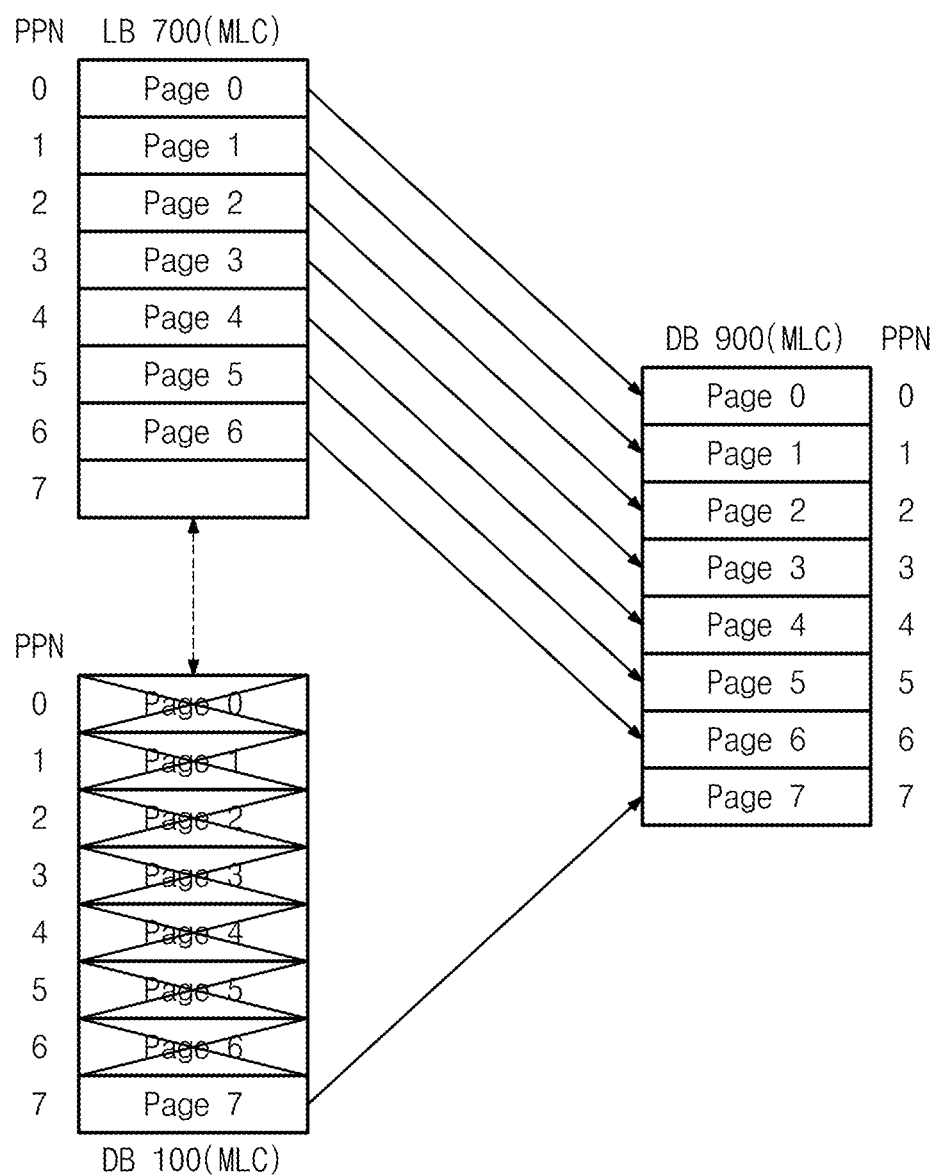
FIG. 9 is a diagram illustrating a method of performing a merge operation for data buffered according to a sequential write pattern according to an embodiment of the inventive concept.

FIG. 9 is a diagram illustrating a method of performing a merge operation on data buffered according to a sequential write pattern in accordance with an embodiment of the inventive concept.

Referring to FIG. 9, data of pages above a reference one of all the pages are written into log block 700 assigned to data block 100 and comprising an MLC block. Even under this condition, the MLC block may be selected as a new data block to store merged data therein, as described below.

In response to a write request occurs from host 110, log block 700 is allocated to data block 100 corresponding to a write-requested logical address LA. Write-requested page data 0, 1, 2, 3, 4, 5, and 6 are stored in log block 700 according to a sequential write pattern. Page data 0, 1, 2, 3, 4, 5, and 6 previously stored in data block 100 is invalidated. However, page data 7 in data block 100 is still valid.

In this case, data requested to be written into log block 700 is page data 0 through page data 6, and the corresponding addresses are input according to a sequential write pattern. Page data 0 through 6 buffered into log block 700 according to the sequential write pattern and page data 7 of data block 100 are merged together. The merged data is sequentially written into new data block 900.

Where data of a size greater than the reference capacity is written in a sequential write pattern, an MLC block can be allocated as a new data block to store the merged data. In this case, only page data 7 of data block 100 is copied to log block 700 to enhance the performance of a merge operation, and log block 700 may be allocated as a new data block.

Figure 10:
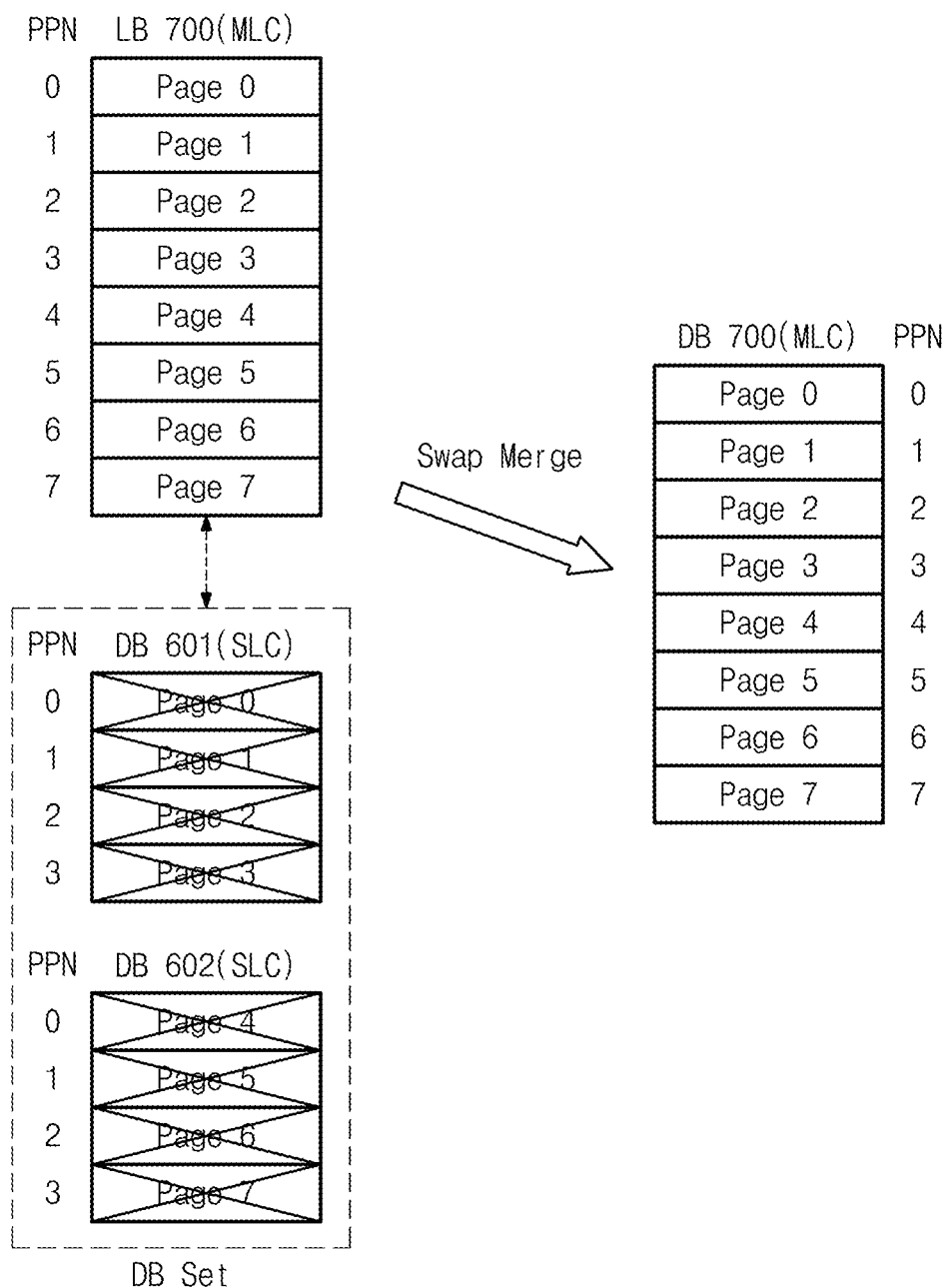
FIG. 10 is a diagram illustrating a method of performing a merge operation for data buffered according to a sequential write pattern according to an embodiment of the inventive concept.

FIG. 10 is a diagram illustrating a method of performing a merge operation of data buffered according to a sequential write pattern in accordance with an embodiment of the inventive concept.

Referring to FIG. 10, data is programmed to log block 700 allocated to data blocks 601 and 602 comprising an SLC block according to a sequential write pattern. At this point, log block 700 is designated as a new data block by a swap merge operation.

In response to a write request, log block 700 comprising an MLC block is allocated to data blocks 601 and 602 corresponding to an SLC block. Write-requested page data 0, 1, 2, 3, 4, 5, 6, and 7 is separately stored in log block 700 according to the sequential write pattern. Page data 0, 1, 2, 3, 4, 5, 6, and 7 previously existing in data blocks 601 and 602 are invalidated.

The data stored in log block 700 according to the sequential write pattern is merged without additional page copy. This is because the data stored in log block 700 already has a page arrangement corresponding to in-place order. Thus, log block 700 is registered as a new data block corresponding to an externally designated logical address LA to be swap-merged.

Figure 11:
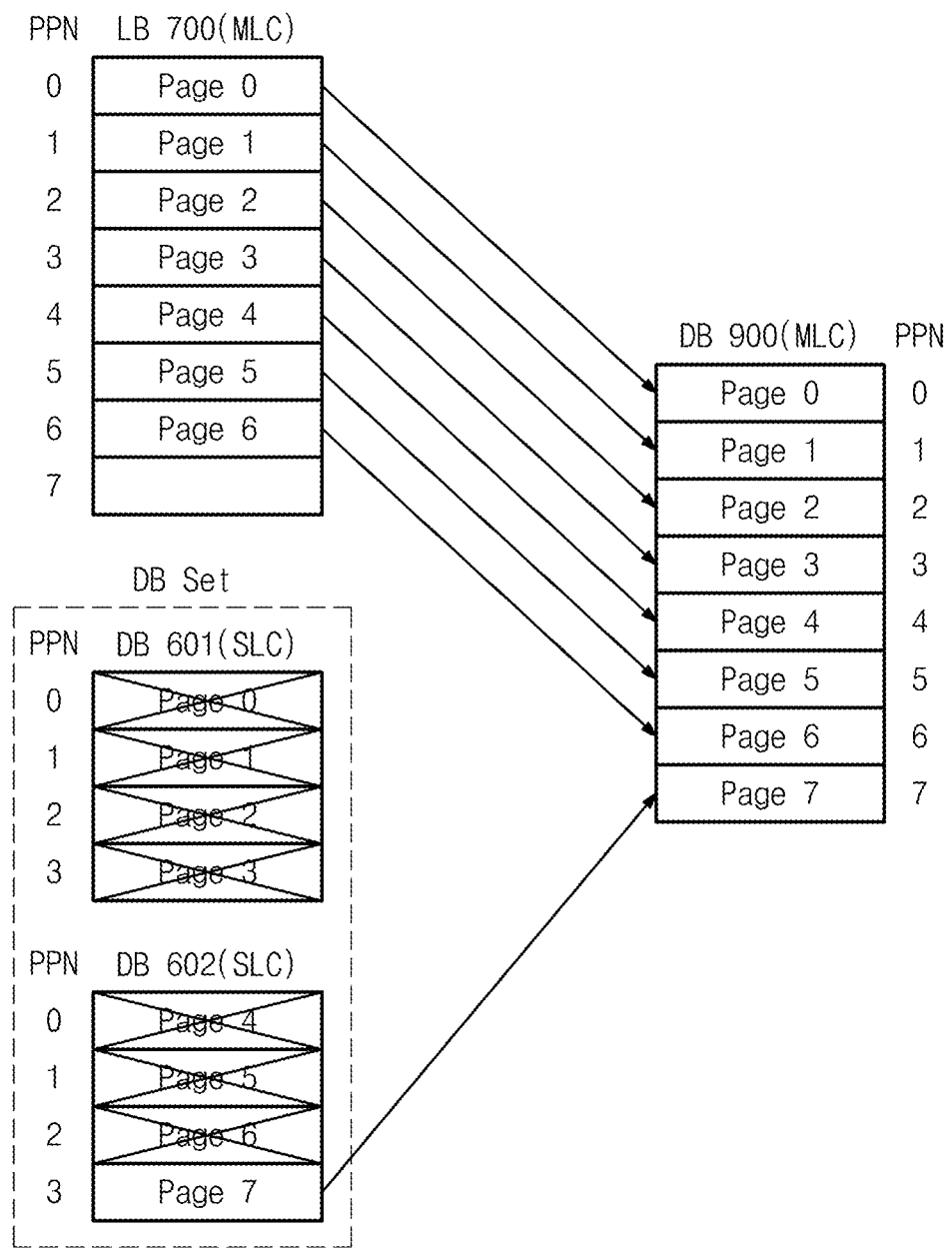
FIG. 11 is a diagram illustrating a method of performing a merge operation for data buffered according to a sequential write pattern according to an embodiment of the inventive concept.

FIG. 11 is a diagram illustrating a method of performing a merge operation on data buffered according to a sequential write pattern in accordance with an embodiment of the inventive concept.

Referring to FIG. 11, log block 700 comprising an MLC block is allocated to a data block set comprising data blocks 601 and 602 comprising SLC blocks. Data is stored in log block 700 according to a sequential write pattern.

In response to a write request from host 110, log block 700 is allocated to data block 100 corresponding to a write-requested address. Write-requested page data 0, 1, 2, 3, 4, 5, and 6 is stored in log block 700 according to a sequential write pattern. Page data 0, 1, 2, 3, 4, 5, and 6 of data blocks 601 and 602 are invalidated. However, page data 7 of data block 602 is still valid.

In this case, data requested to be written into log block 700 is page data 0 through 6 and their addresses are input according to a sequential write pattern. Page data 0 through 6 buffered in log block 700 according to the sequential write pattern and valid page data 7 of data block 100 are merged together. The merged data is sequentially written into a new data block 900.

As indicated above with reference to FIG. 11, merged data can be copied to a data block comprising an MLC block although data are buffered into a part of a log block according to a sequential write pattern.

Figure 12:
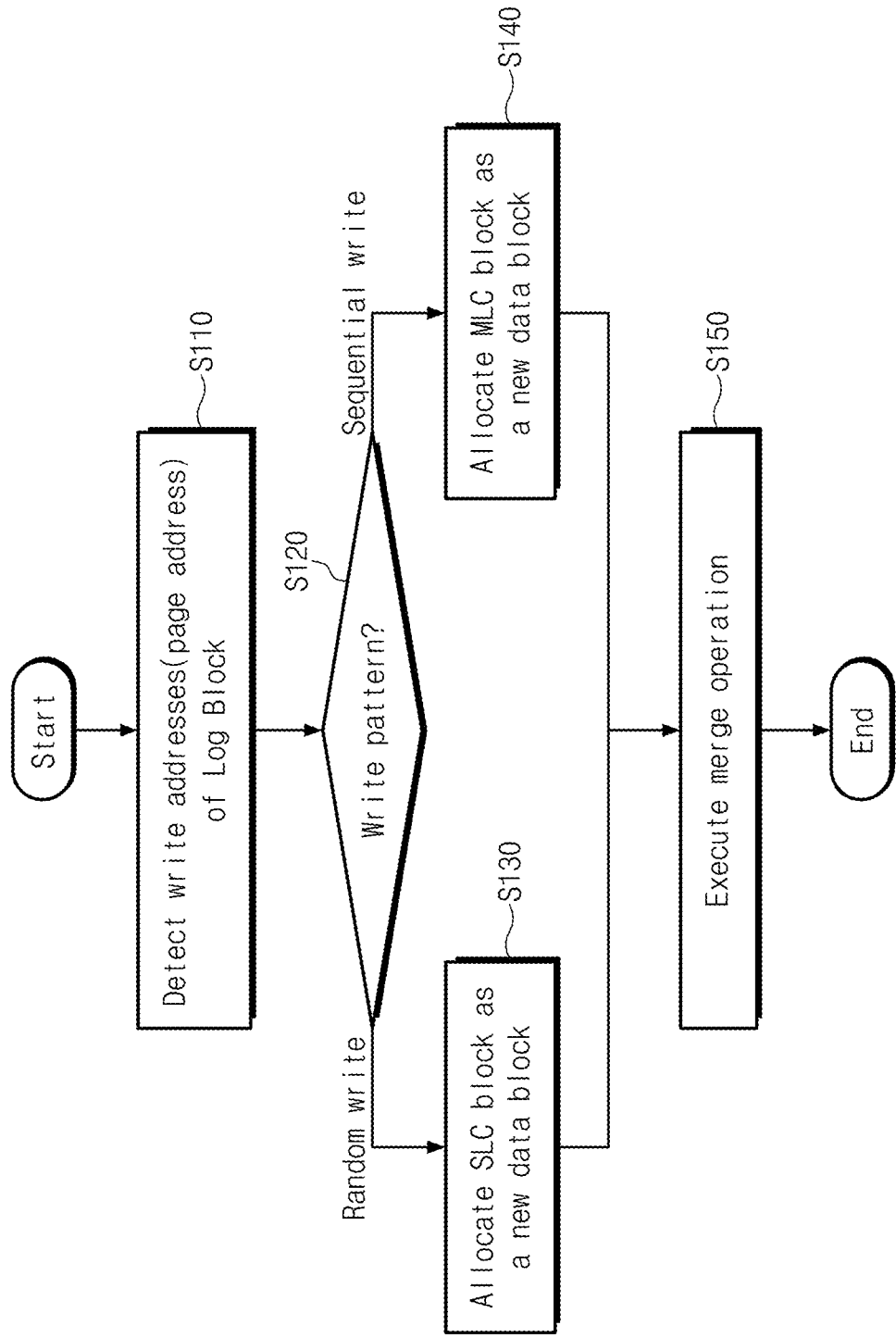
FIG. 12 is a flowchart illustrating a method of performing a write operation according to an embodiment of the inventive concept.

FIG. 12 is a flowchart illustrating a method of performing a write operation according to an embodiment of the inventive concept.

Referring to FIG. 12, the method selects a type of data block in which to store merged data according to a write pattern of data buffered in a log block. In response to a write request, data and an address are provided from host 110, and memory controller 120 starts a write operation for nonvolatile memory device 130.

In a step S110, memory controller 120 or flash translation layer 230 detects a write pattern of data stored in a log block. Memory controller 120 detects whether data is programmed with a page address that is continuous or discontinuous in the log block. The continuity or discontinuity of the page address is determined according to the order of a page address of a data block corresponding to a log block.

In a step S120, memory controller 120 determines whether a write pattern of data buffered into the log block is a sequential write pattern or a random write pattern. Where the write pattern is a random write pattern, the method proceeds to a step S130. Where the write pattern is the sequential write pattern, the method proceeds to a step S140.

In step S130, memory controller 120 of flash translation layer 230 selects an SLC block as a new data block for storing valid data of a log block and a data block after merging the valid data together. At this point, a data block set comprising at least two SLC blocks is formed to satisfy a data capacity condition.

In step S140, memory controller 120 or flash translation layer 230 selects an MLC block as a new data block for storing valid data of a log block and a data block after merging the valid data together.

In a step S150, memory controller 120 and flash translation layer 230 merge the valid data of the log block and the data block together. Continuously input data such as streaming data may be sequentially written according to a sequential write pattern. In this case, a log block storing page data in the sequential write pattern may be designated as a new data block without page copy for swap merge. On the other hand, an SLC block may be selected as a data block for programming merged data to perform a high-speed merge operation for a log block into which data are buffered according to the random write pattern.

Figure 13:
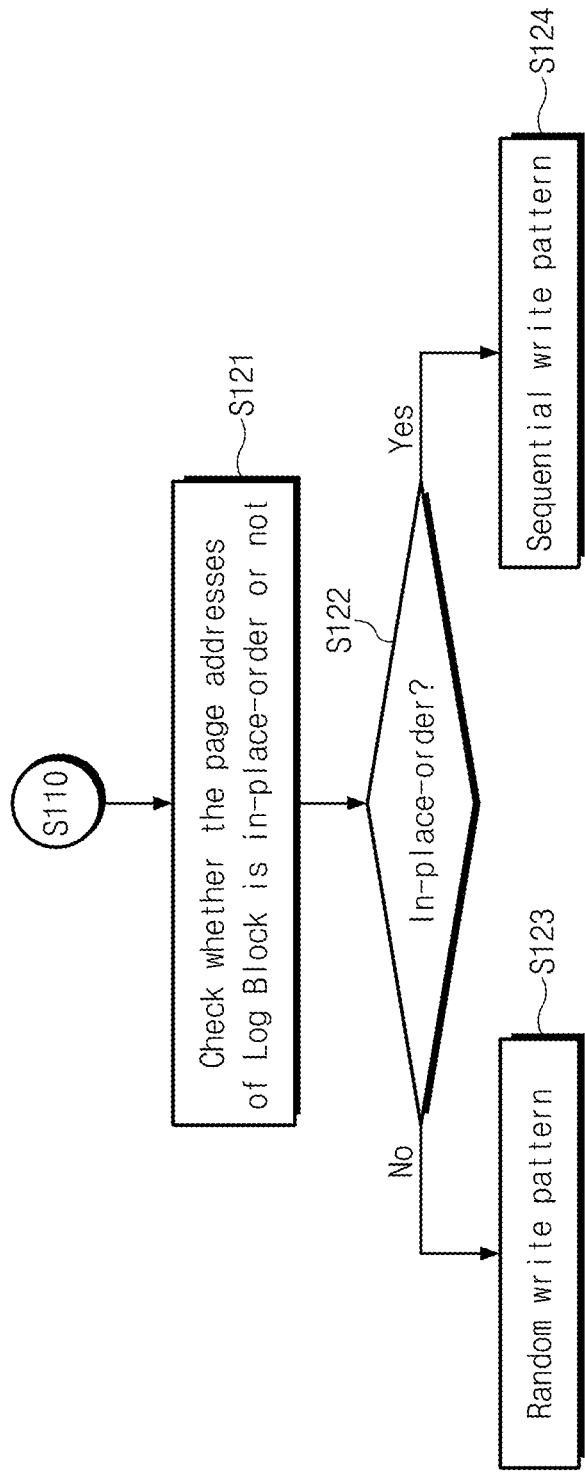
FIG. 13 is a flowchart illustrating a method of analyzing a write pattern of data buffered in a log block according to an embodiment of the inventive concept.

FIG. 13 is a flowchart illustrating a method of determining a write pattern of data buffered into a log block.

Referring to FIG. 13, a random write pattern or a sequential write pattern is determined according to the order of the page address detected in step S110 of FIG. 12.

In a step S121, memory controller 120 or flash translation layer 230 determines whether page addresses of data buffered into a log block is in-place order. Memory controller 120 or flash translation layer 230 determines whether data stored in a log block is stored in one physical block according to the sequential write pattern. Where the order of the data stored in the log block is random irrespective of the order of a corresponding data block, the data may be considered to be stored according to an in-place order or the sequential write pattern.

In a step S122, memory controller 120 or flash translation layer 230 determines whether the page address of the log block is in the in-place order. Where the page address of the log block does is not in the in-place order, memory controller 120 or flash translation layer 230 determines a write pattern of the log block as the random write pattern (S123). On the other hand, where the page address of the log block is the in-place order, memory controller 120 and flash translation layer 230 determine the write pattern of the log block as the sequential write pattern (S124).

Figure 14:
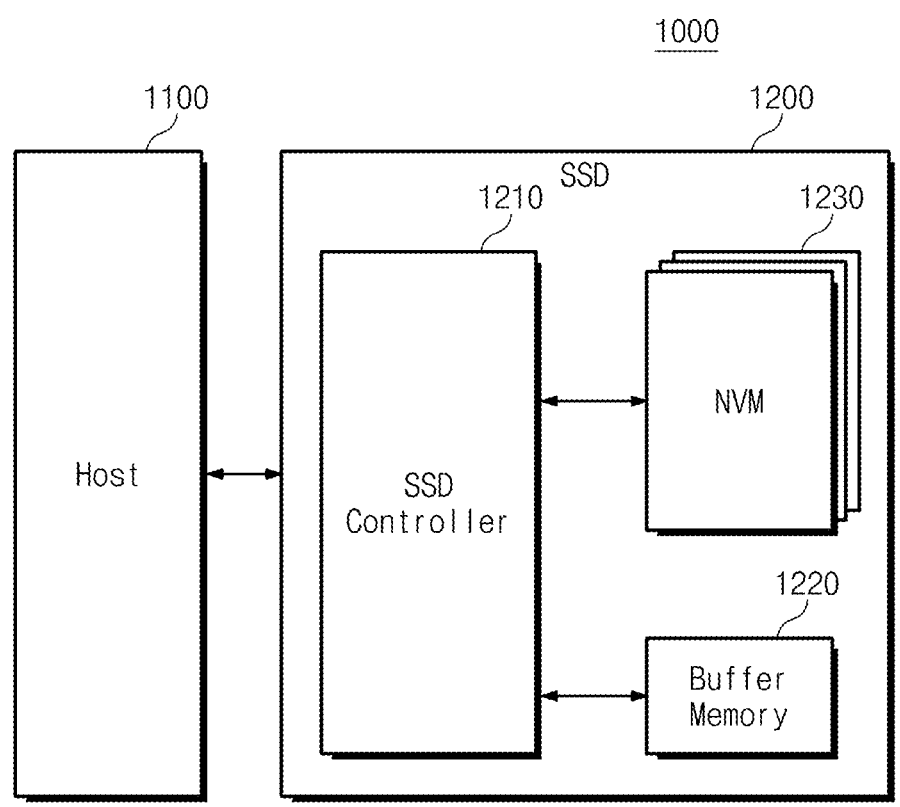
FIG. 14 is a block diagram of a solid state disk (SSD) system according to an embodiment of the inventive concept.

FIG. 14 is a block diagram of an SSD system 1000 according to an embodiment of the inventive concept.

Referring to FIG. 14, SSD system 1000 comprises a host 1100 and an SSD 1200. SSD 1200 comprises an SSD controller 1210, a buffer memory 1220, and a nonvolatile memory device 1230.

SSD controller 1210 provides a physical connection between host 1100 and SSD 1200. That is, SSD controller 1210 interfaces with SSD 1200 according to a bus format of host 1100. SSD controller 1200 decodes a command provided from host 1100. According to a result of the decoding, SSD controller 1210 performs an access operation of nonvolatile memory device 1230. The bus format of host 110 can be, for instance, universal serial bus (USB), small computer system interface (SCSI), PCI express, ATA, parallel ATA (PATA), serial ATA (SATA), or serial attached SCSI (SAS).

In response to a write request from host 1100, SSD controller 1210 selects a new data block to store data to be merged with reference to a write pattern of data buffered into a log block. For example, where data is buffered in a log block according to a sequential write pattern, SSD controller 1210 allocates an MLC block as a new data block to copy the buffered data thereto. On the other hand, where data is buffered according to a random write pattern, SSD controller 1210 allocates SLC blocks as a new data block to copy the buffered data thereto. The SLC blocks may constitute a data block including at least two set units.

Write data provided from host 1100 or data read from nonvolatile memory device 1230 is temporarily stored in buffer memory 1220. Where data in nonvolatile memory device 1230 is cached in response to a write request of host 110, buffer memory 1220 supports a cache function to provide the cached data directly to host 1100. In general, data transmission speed based on a bus format (e.g., SATA or SAS) of host 1100 is much higher than that of a memory channel of SSD 1200. That is, where interface speed of host 1100 is much higher, a high-capacity buffer memory 1220 may be provided to minimize performance degradation resulting from a difference in speed.

Buffer memory 1220 can be a synchronous DRAM to provide sufficient buffering at SSD 1200. However, buffer memory 1220 is not limited to the described configuration.

Nonvolatile memory device 1230 is provided as a storage medium of SSD 1200. For example, nonvolatile memory device 1230 may be a NAND-type flash memory device having high-capacity storage capability. Nonvolatile memory device 1230 may comprise a plurality of memory devices. In this case, each of the memory devices is connected to SSD controller 1210 in a unit of a channel.

Although it has been described that nonvolatile memory device 1230 is a NAND-type flash memory used as a storage medium of SSD 1200, nonvolatile memory device 1230 can comprise another type of nonvolatile memory device. For example, a PRAM, an MRAM, an ReRAM, an FRAM, or a NOR-type flash memory may be used as a storage medium and applied to a memory system in which different types of memory devices are combined. In addition, a nonvolatile memory device (e.g., DRAM) may be included as a storage medium.

Figure 15:
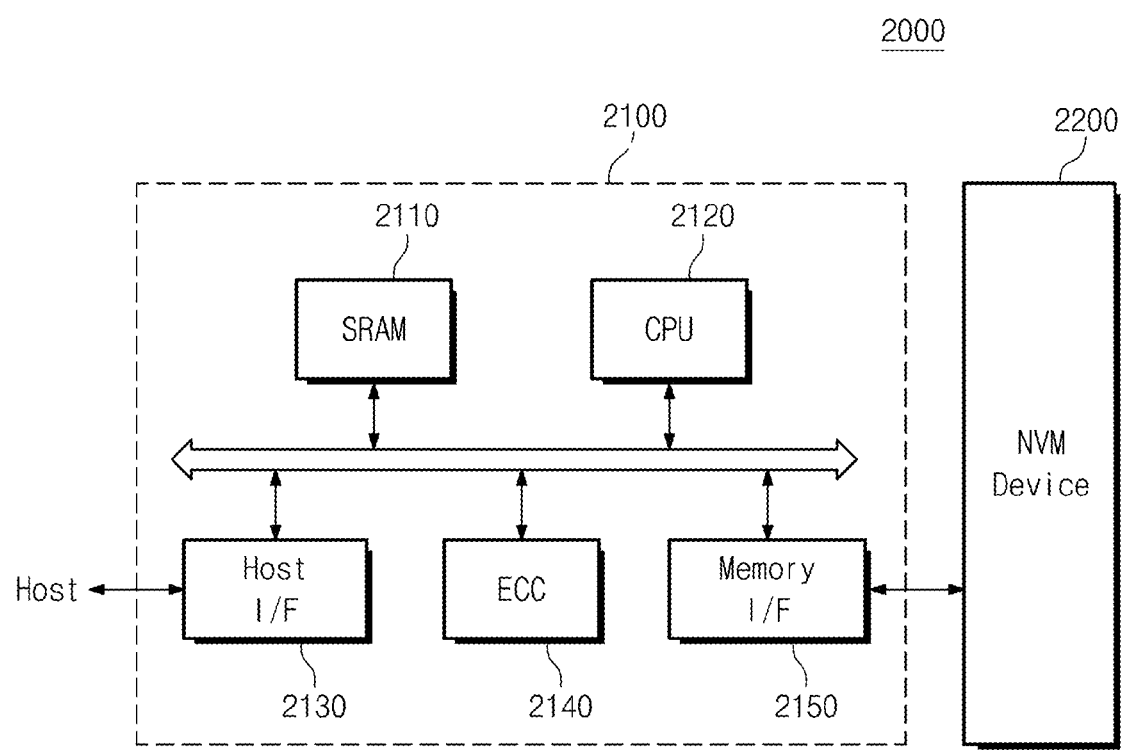
FIG. 15 is a block diagram of a memory system according to an embodiment of the inventive concept.

FIG. 15 is a block diagram of a memory system 2000 according to an embodiment of the inventive concept.

Referring to FIG. 15, memory system 200 comprises a nonvolatile memory device 2200 and a memory controller 2100.

Memory controller 2100 is configured to control nonvolatile memory device 2200. Memory device 2200 and memory controller 2100 can be combined as a memory card. An SRAM 2110 is used as a working memory of a central processing unit (CPU) 2120. A host interface 2130 implements a data exchange protocol of a host connected to memory system 2000. An error correction code (ECC) block 2140 detects and corrects errors in data read from nonvolatile memory device 2200. A memory interface 2150 interfaces with nonvolatile memory device 2200 according to an embodiment of the inventive concept. CPU 2120 performs control operations for data exchange of memory controller 2100. Although not shown in FIG. 15, memory system 2000 can further include a ROM (not shown) in which code data for interfacing with a host is stored.

In response to a write request from the host, memory controller 2100 selects a new data block to store data to be merged with reference to a write pattern of data buffered into a log block. For example, where data is buffered in a log block according to a sequential write pattern, memory controller 2100 allocates an MLC block as a new data block to receive the buffered data. On the other hand, where data is buffered according to a random write pattern, memory controller 2100 allocates SLC blocks as a new data block to receive the buffered data. The SLC blocks constitute a data block comprising at least two set units.

Nonvolatile memory device 2200 can be provided in a multi-chip package comprising a plurality of memory chips. Memory system 2000 can be provided as a high-reliability storage medium with a low error occurrence probability. In this case, memory controller 2100 can be configured to communicate with an external device, such as a host, through one of various interface protocols such as USB, MMC, PCI-E, SATA, PATA, SCSI, ESDI, or IDE.

Figure 16:
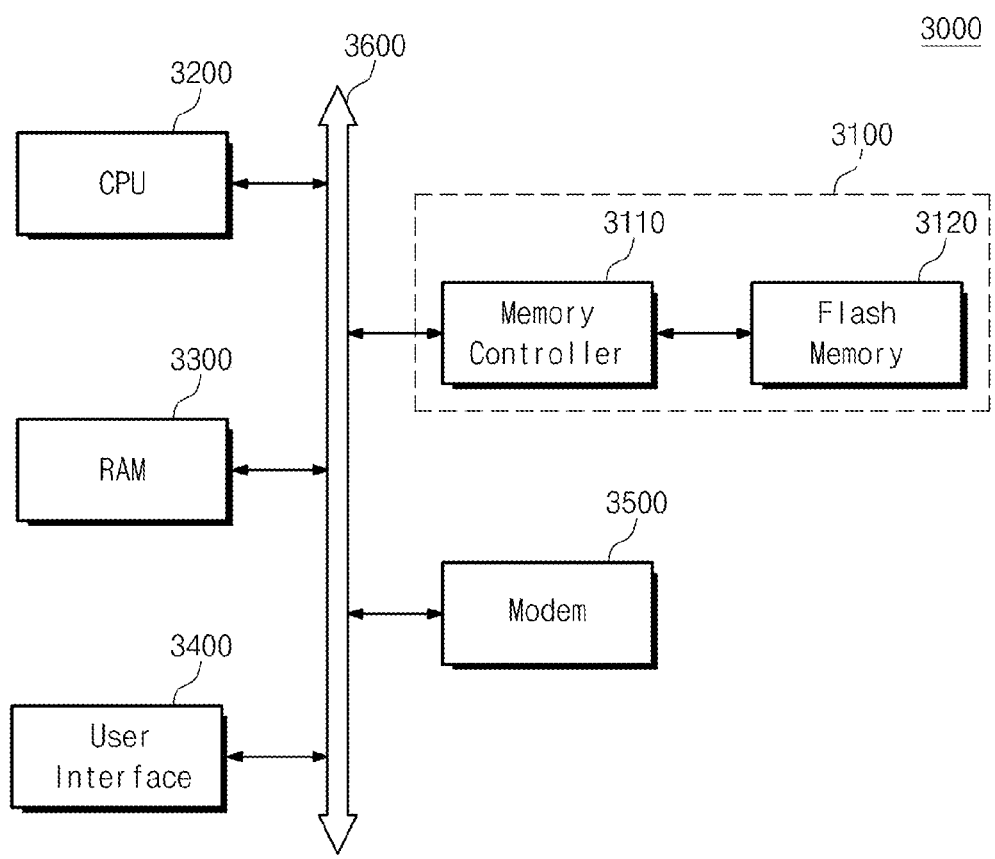
FIG. 16 is a block diagram of a computing system according to an embodiment of the inventive concept.

FIG. 16 is a block diagram of a computing system 3000 according to an embodiment of the inventive concept.

Referring to FIG. 16, computing system 3000 comprises a microprocessor 3200, a RAM 3300, a user interface 3400, a modem (e.g., baseband chipset) 3500, and a memory system 3100 that are electrically connected to a system bus 3600. Computing system 3000 can be organized with the same structure as an SSD in FIG. 14 or as shown in FIG. 15.

Where computing system 3000 is a mobile device, it can further include a battery (not shown) for supplying an operation voltage of computing system 3200. Although not illustrated in FIG. 16, computing system 1200 can further include an application chipset, a camera image processor (CIS), or a mobile DRAM. For example, memory system 3100 may constitute an SSD that uses a nonvolatile memory to store data. Alternatively, memory system 3100 can be provided as a fusion flash memory (e.g., a one-NAND flash memory).

In response to a write request of microprocessor 3200, memory controller 3110 selects a new data block to store data to be merged with reference to a write pattern of data buffered into a log block. For example, where data is buffered a log block according to a sequential write pattern, memory controller 3110 allocates an MLC block as a new data block to receive the buffered data. On the other hand, where data is buffered according to a random write pattern, memory controller 3110 allocates SLC blocks as a new data block to receive the buffered data. The SLC blocks may constitute a data block comprising at least two set units.

The above-described flash memory devices and/or memory controllers can be mounted in various types of packages or package configurations. For example, they can be packaged in package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flatpack (TQFP), small outline (SOIC), shrink small outline package (SSOP), thin small outline package (TSOP), system in package (SIP), multi chip package (MCP), wafer-level fabricated package (WFP), and wafer-level processed stack package (WSP).

As indicated by the foregoing, embodiments of the inventive concept provide a memory system capable of performing a high-speed write operation by improving efficiency of a merge operation.

While the inventive concept has been described with reference to selected embodiments, it will be apparent to those skilled in the art that various changes and modifications can be made to the embodiments without departing from the scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A method of performing a write operation in a nonvolatile memory device, comprising:
    storing write data in a log block for updating a data block, wherein the log block and the data block are different physical memory blocks having a common logical block address;
    determining whether a write pattern of data in the log block is a sequential write pattern or a random write pattern;
    selecting at least one new data block for storing merged data from the data block and the log block, the at least one new data block being a single-level cell (SLC) block or a multi-level cell (MLC) block depending on the determined write pattern; and
    merging valid data from the log block and the data block into the selected at least one new block.

2. The method of claim 1, wherein the write pattern is determined according to a page address of the write data.

3. The method of claim 2, wherein the sequential write pattern is determined according to a pattern of continuous page addresses, and the random write pattern is determined according to a pattern of discontinuous page addresses.

4. The method of claim 1, wherein the log block is a multi-level cell block.

5. The method of claim 1, wherein during selection of the at least one new data block, a single level cell block is selected as a new data block where the write pattern is the random write pattern.

6. The method of claim 5, wherein the at least one new data block comprises a at least two single-level cell (SLC) blocks.

7. The method of claim 1, wherein during selection of the at least one new data block, the at least one new data block is allocated as a multi-level cell (MLC) block where the write pattern is the sequential write pattern.

8. The method of claim 1, further comprising designating a second log block as a new data block in a swap-merge operation upon determining that the second log block comprises data stored in an in-place order.

9. A memory system, comprising:
    a nonvolatile memory device configured to program data in a memory block according to a write mode that is a single-level cell (SLC) mode or a multi-level cell (MLC) mode; and
    a memory controller configured to control the nonvolatile memory device according to an address mapping method that uses a log block to update a selected data block, wherein the log block and the selected data block are different physical memory blocks having a common logical block address, wherein the memory controller determines the write mode for merging data from the log block and the selected data block into a at least one new data block according to a write pattern of data in the log block, and wherein merging the data from the log block and the selected data block into the at least one new data block comprises merging valid data from the log block and the selected data block into the at least one new block.

10. The memory system of claim 9, wherein the memory controller stores data in the log block in the MLC mode.

11. The memory system of claim 9, wherein the memory controller programs the merged data in the at least one new data block in the SLC mode where the write pattern is a random write pattern.

12. The memory system as set forth in claim 11, wherein the at least one new data block comprises at least two memory blocks.

13. The memory system as set forth in claim 9, wherein the memory controller programs the merged data to a new data block in the MLC mode where the write pattern is a sequential write pattern.

14. The memory system as set forth in 13, wherein the memory controller performs a swap-merge operation to update an address mapping table such that a second log block is designated as a new data block.

15. A method of operating a nonvolatile memory device, comprising:
    designating a multi-level cell (MLC) memory block as a log block for buffering data to be stored in a data block, wherein the log block and the data block are different physical memory blocks having a common logical block address;
    determining a write pattern of data stored in the log block; and
    merging data from the log block and the data block into at least one new data block in a single level cell (SLC) mode or an MLC mode according to whether the write pattern is a sequential write pattern or a random write pattern.

16. The method of claim 15, wherein the data is merged from the log block and the data block into the at least one new data block in the SLC mode after determining that the write pattern is the random write pattern.

17. The method of claim 15, wherein the random write pattern corresponds to adjacent pages of data in the log block having discontinuous logical page addresses.

18. The method of claim 15, wherein the MLC memory block is a 2-level cell memory block.

19. The method of claim 15, further comprising performing the merging as a consequence of determining that allocated log blocks are unavailable.

20. The method of claim 15, further comprising invalidating data stored in the log block after performing the merging.

* * * * *